United States Patent
Gundall et al.

(10) Patent No.: US 9,440,559 B2
(45) Date of Patent: Sep. 13, 2016

(54) VEHICLE SEAT

(71) Applicant: Johnson Controls Components GmbH & Co. KG, Kaiserslautern (DE)

(72) Inventors: Thomas Gundall, Queidersbach (DE); Uwe Reichel, Kottweiler-Schwanden (DE); Adolf Vogt, Alsenz (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 14/420,756

(22) PCT Filed: Aug. 14, 2013

(86) PCT No.: PCT/EP2013/066955
§ 371 (c)(1),
(2) Date: Feb. 10, 2015

(87) PCT Pub. No.: WO2014/027010
PCT Pub. Date: Feb. 20, 2014

(65) Prior Publication Data
US 2015/0231992 A1    Aug. 20, 2015

(30) Foreign Application Priority Data

Aug. 14, 2012   (DE) .................. 10 2012 016 230
Sep. 26, 2012   (DE) .................. 10 2012 019 574

(51) Int. Cl.
| | |
|---|---|
| B60N 2/12 | (2006.01) |
| B60N 2/16 | (2006.01) |
| B60N 2/18 | (2006.01) |
| B60N 2/22 | (2006.01) |
| B60N 2/68 | (2006.01) |

(52) U.S. Cl.
CPC ............. B60N 2/162 (2013.01); B60N 2/1685 (2013.01); B60N 2/68 (2013.01)

(58) Field of Classification Search
CPC ....... B60N 2/162; B60N 2/1685; B60N 2/68
USPC ........................ 297/344.15, 344.16, 344.17
See application file for complete search history.

(56) References Cited

U.S. PATENT DOCUMENTS 3,110,476 A * 11/1963 Farris ..................... B65G 69/24
                                                            108/119
3,282,566 A * 11/1966 Clarke ..................... A47B 9/18
                                                            108/147

(Continued)

FOREIGN PATENT DOCUMENTS

DE      20 2005 021119 U1    3/2007
DE      102006021886 B3 *    10/2007    ............... B60N 2/06

(Continued)

*Primary Examiner* — Rodney B White
(74) *Attorney, Agent, or Firm* — McGlew and Tuttle, P.C.

(57) ABSTRACT

A vehicle seat (1), in particular a commercial vehicle seat, includes a scissor-type (scissors) framework (3) for adjusting the height. The scissors framework has intersecting rockers (8a, 8b) and at least one frame (5, 7), and at least one bearing device (21) for movably guiding the rockers (8a, 8b) in the frame (5, 7). A rotatable bearing roller (14) interacts with a first guide and a rotatable compensation roller (36) interacts with a second guide attached to a base region (52) of an insert (60). A lateral region (54) of the insert (60) extends perpendicularly to the base region (52) and is fixed to the frame (5, 7) and/or a head region (50) of the insert (60), extending parallel to the base region (52), is fixed to the frame (5, 7). The base region (52) is resiliently designed and presses against the compensation roller (36).

16 Claims, 6 Drawing Sheets

(56) References Cited

U.S. PATENT DOCUMENTS

| | | | | |
|---|---|---|---|---|
| 3,826,457 A | * | 7/1974 | Huot de Longchamp | B60N 2/502 248/421 |
| 4,093,197 A | * | 6/1978 | Carter | A47C 3/025 267/131 |
| 4,125,242 A | * | 11/1978 | Meiller | A47C 3/22 248/421 |
| 4,221,280 A | * | 9/1980 | Richards | B66F 7/065 187/269 |
| 4,312,491 A | * | 1/1982 | Aondetto | B60N 2/502 248/421 |
| 4,350,317 A | * | 9/1982 | Aondetto | B60N 2/502 248/430 |
| 4,382,573 A | * | 5/1983 | Aondetto | B60N 2/072 248/419 |
| 4,403,680 A | * | 9/1983 | Hillesheimer | B66F 7/065 177/146 |
| 4,448,386 A | * | 5/1984 | Moorhouse | B60N 2/502 248/564 |
| 4,461,444 A | * | 7/1984 | Grassl | B60N 2/501 297/344.15 X |
| 4,573,657 A | * | 3/1986 | Sakamoto | B60N 2/502 248/421 |
| 4,577,821 A | * | 3/1986 | Edmo | B66F 7/08 108/145 |
| 4,659,052 A | * | 4/1987 | Nagata | B60N 2/502 248/231.21 |
| 4,729,539 A | * | 3/1988 | Nagata | B60N 2/502 297/344.15 X |
| 4,764,075 A | * | 8/1988 | Cox | B65G 1/07 108/136 |
| 4,813,645 A | * | 3/1989 | Iwami | B60N 2/502 248/429 |
| 4,822,094 A | * | 4/1989 | Oldfather | B60N 2/501 297/344.16 X |
| 4,858,888 A | * | 8/1989 | Cruz | B66F 7/08 254/122 |
| 4,890,810 A | * | 1/1990 | Sakamoto | B60N 2/502 248/575 |
| 4,899,987 A | * | 2/1990 | Craig | B66F 7/08 254/122 |
| 4,941,641 A | * | 7/1990 | Granzow | B60N 2/501 248/161 |
| 4,995,130 A | * | 2/1991 | Hahn | B65G 69/2823 14/71.3 |
| 5,005,894 A | * | 4/1991 | Nagata | B60N 2/502 248/421 |
| 5,058,852 A | * | 10/1991 | Meier | B60N 2/501 248/406.2 |
| 5,105,915 A | * | 4/1992 | Gary | A61G 3/063 14/71.3 |
| 5,111,546 A | * | 5/1992 | Hahn | B65G 69/2823 14/71.3 |
| 5,169,112 A | * | 12/1992 | Boyles | B60N 2/501 248/406.2 |
| 5,192,053 A | * | 3/1993 | Sehlstedt | B66F 7/08 182/69.5 |
| 5,211,369 A | * | 5/1993 | Hoerner | B60N 2/502 248/588 |
| 5,251,864 A | * | 10/1993 | Itou | B60N 2/502 248/588 |
| 5,299,906 A | * | 4/1994 | Stone | B65G 1/07 187/269 |
| 5,322,143 A | * | 6/1994 | Curran | B66F 7/065 187/211 |
| 5,364,060 A | * | 11/1994 | Donovan | B60N 2/502 248/421 |
| 5,388,801 A | * | 2/1995 | Edrich | B60N 2/502 248/421 |
| 5,580,027 A | * | 12/1996 | Brodersen | B60N 2/502 248/162.1 |
| 5,632,209 A | * | 5/1997 | Sakakibara | A47B 9/02 108/145 |
| 5,794,911 A | * | 8/1998 | Hill | B60N 2/502 248/419 |
| 5,927,679 A | * | 7/1999 | Hill | B60N 2/502 297/344.15 X |
| 5,954,400 A | * | 9/1999 | Brodersen | B60N 2/502 248/280.11 |
| 5,975,508 A | * | 11/1999 | Beard | B60N 2/501 180/89.12 |
| 6,200,032 B1 | | 3/2001 | Ropp | |
| 6,202,972 B1 | * | 3/2001 | Manavi | B60N 2/52 248/421 |
| 6,550,740 B1 | * | 4/2003 | Burer | B60N 2/502 248/370 |
| 6,644,737 B2 | * | 11/2003 | Kohl | B60N 2/502 297/344.15 X |
| 7,152,839 B2 | * | 12/2006 | Mullinix | B60N 2/501 248/421 |
| 7,383,923 B2 | * | 6/2008 | Patten | B66F 7/065 108/105 |
| 7,413,158 B1 | * | 8/2008 | Burer | B60N 2/42736 248/421 |
| 7,552,683 B2 | * | 6/2009 | Hayashi | B62D 65/18 104/89 |
| 7,775,718 B2 | * | 8/2010 | Kohl | B60N 2/0722 248/430 |
| 7,896,134 B2 | * | 3/2011 | Morris | A61G 3/063 187/200 |
| 7,988,232 B2 | * | 8/2011 | Weber | B60N 2/162 297/344.15 X |
| 8,303,037 B2 | * | 11/2012 | Weber | B60N 2/1867 297/344.15 |
| 8,360,524 B2 | * | 1/2013 | Deml | B60N 2/502 297/344.15 X |
| 8,414,054 B2 | * | 4/2013 | Komatsubara | B60N 2/1814 297/344.16 X |
| 8,439,334 B2 | * | 5/2013 | Deml | B60N 2/502 248/588 |
| 8,469,152 B2 | * | 6/2013 | Olsen | B66F 7/065 187/211 |
| 8,622,363 B2 | * | 1/2014 | Ellerich | B60N 2/502 297/344.15 X |
| 8,641,141 B2 | * | 2/2014 | Hassler | B60N 2/0705 297/344.15 X |
| 8,684,339 B2 | * | 4/2014 | Deml | B60N 2/502 248/588 |
| 8,733,508 B2 | * | 5/2014 | Bacon | B66F 7/065 187/240 |
| 8,783,772 B2 | * | 7/2014 | Schuler | B60N 2/502 297/344.15 |
| 8,894,152 B2 | * | 11/2014 | Lorey | B60N 2/502 297/344.16 X |
| 9,120,410 B2 | * | 9/2015 | Bauman | B63B 29/04 |
| 2004/0000664 A1 | * | 1/2004 | Watkins | B66F 7/08 254/9 C |
| 2006/0278805 A1 | * | 12/2006 | Haller | B60N 2/502 248/588 |
| 2007/0235266 A1 | * | 10/2007 | Dantas | B66B 9/04 187/269 |
| 2008/0197684 A1 | * | 8/2008 | Ott | B60N 2/501 297/344.16 |
| 2009/0179390 A1 | * | 7/2009 | Wurmthaler | B60N 2/501 280/5.519 |
| 2010/0072800 A1 | * | 3/2010 | Weber | B60N 2/508 297/344.15 |
| 2011/0226930 A1 | * | 9/2011 | Enns | B60N 2/508 248/569 |
| 2012/0001468 A1 | * | 1/2012 | Schuler | B60N 2/502 297/344.16 |
| 2013/0341984 A1 | * | 12/2013 | Olesen | A61G 5/1059 297/344.15 |

FOREIGN PATENT DOCUMENTS

| | | | |
|---|---|---|---|
| DE | 10 2006 059 088 B4 | 2/2010 | |
| DE | 102012019574 A1 | * 2/2014 | B60N 2/508 |

* cited by examiner

VEHICLE SEAT

CROSS REFERENCE TO RELATED APPLICATIONS

This application is a United States National Phase Application of International Application PCT/EP2013/066955 filed Aug. 14, 2013 and claims the benefit of priority under 35 U.S.C. §119 of German Patent Applications DE 10 2012 016 230.8 filed Aug. 14, 2012 and DE 10 2012 019 574.5 filed Sep. 26, 2012, the entire contents of which are incorporated herein by reference.

FIELD OF THE INVENTION

The invention relates to a vehicle seat, in particular a utility vehicle seat with a scissors-type (scissors) stand for adjusting the height, such a scissors stand having intersected rockers and at least one frame, and also a bearing device by means of which at least one of the rockers is guided movably in the frame, wherein the bearing device has a bearing roller which is rotatable about a bearing axis and which interacts with a first guide, and a compensating roller which is rotatable about the bearing axis and interacts with a second guide.

BACKGROUND OF THE INVENTION

A vehicle seat of the type in question which can be adjusted in height by means of a scissors stand is known from DE 10 2006 059 088 B4.

The scissors stand here comprises a lower frame, an upper frame arranged above the latter, and, on both sides, a respective pair of intersected rockers. The rockers of the scissors stand here are connected to each other in pairs by means of a plurality of transverse tubes. In the rear region of the vehicle seat, the rockers are articulated on the lower frame and on the upper frame by means of the transverse tubes.

Bearing devices by means of which the rockers are guided movably in the longitudinal direction in the upper frame and in the lower frame are provided in the front region of the vehicle seat. The bearing devices here in each case have two rotatable rollers which interact with guides in the upper frame and in the lower frame.

Upon a change in height of the scissors stand, the rollers roll in the longitudinal direction on corresponding guides in the upper frame and in the lower frame. In the process, in each case one of the rollers of a bearing device runs on an upper guide and the other of the rollers runs on a lower guide.

A vehicle seat of the type in question is also known from U.S. Pat. No. 6,200,032 B1. In order to reduce the play, in particular in the vertical direction, two rollers having different diameters are provided here, wherein the roller positioned on the inside has a larger diameter than the roller positioned on the outside.

SUMMARY OF THE INVENTION

The invention is based on the object of improving a vehicle seat of the type mentioned at the beginning, and in particular of indicating an alternative configuration in order to reduce play.

A vehicle seat of the type in question, in particular a utility vehicle seat, comprises a scissors stand for adjusting the height. The scissors stand has intersected rockers and at least one frame, and also a bearing device by means of which at least one of the rockers is guided movably in the frame. The bearing device has a bearing roller which is rotatable about a bearing axis and interacts with a first guide, and a compensating roller which is rotatable about the bearing axis and interacts with a second guide.

According to the invention, it is provided here that the second guide for the compensating roller is attached to a foot region of an insert, and in that a side region of the insert, which side region extends at a right angle to the foot region, is fastened to the frame, and/or in that a head region of the insert, which head region extends parallel to the foot region, is fastened to the frame, and in that the foot region is of elastically deformable design and presses against the compensating roller.

The foot region, owing to the elasticity thereof and prestressing by the second guide, presses here against the compensating roller, as a result of which the load roller is pressed against the first guide. As a result, play present between the guides and load roller and the compensating roller is reduced or eliminated.

Simple installation of the insert is produced if the frame has a C-shaped profile which is open toward the interior of the vehicle seat and comprises an upper limb, a lower limb running parallel to the upper limb and a base limb which runs at a right angle to the upper limb and connects the upper limb to the lower limb, wherein the side region is fastened, preferably welded, to the base limb, and/or the head region is fastened, preferably welded, to the upper limb.

For this purpose, the insert preferably likewise has an open C-shaped profile, as a result of which the installation is simplified even further.

The head region of the insert advantageously forms the first guide for the load roller here.

The alignment of the insert on the frame during installation is simplified by the fact that the head region runs parallel to the upper limb and bears tightly against the upper limb.

The foot region is advantageously arranged parallel or at least substantially parallel to the lower limb, wherein a gap is provided between the foot region and the lower limb. As a result, an elastic deformation of the foot region in the direction of the lower limb, and also in the direction away from the lower limb, is possible.

According to an advantageous configuration of the invention, the foot region comprises a first section which adjoins the side region, and a second section which faces away from the side region, wherein the second section is designed in the form of an embossed step and is arranged offset parallel to the first section. The embossed step here ensures the required distance between the first section of the load roller in order to avoid contact of the foot region with the load roller.

The second section here preferably also forms the second guide for the compensating roller.

According to a further advantageous configuration of the invention, a support which forms the second guide for the compensating roller is mounted on the foot region. In this case, the support ensures the required distance between the first section and the load roller in order to avoid contact of the foot region with the load roller.

The insert is preferably composed of metal, preferably of steel. This permits welding of the insert to the frame and at the same time provides the foot region with the required elasticity.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
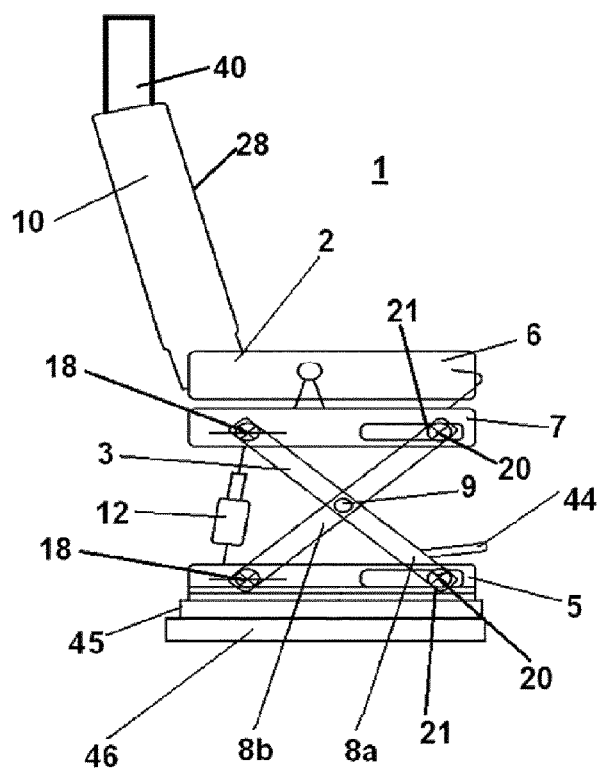
FIG. 1 is a schematic illustration of a vehicle seat.
Figure 2:
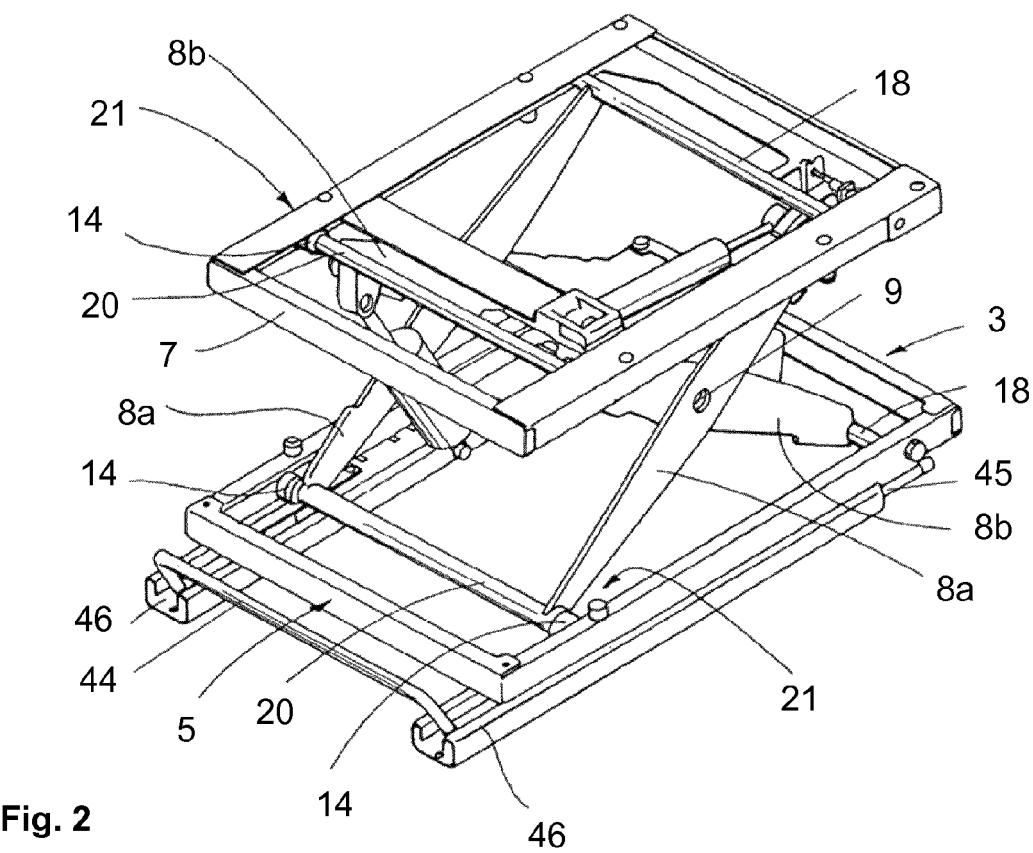
FIG. 2 is a perspective illustration of a vehicle seat without seat part.

A vehicle seat 1 for a utility vehicle has a scissors stand 3, which comprises a lower frame 5, an upper frame 7 arranged above the latter, and, on both sides, a respective pair of intersected first rockers 8a and second rockers 8b. A transverse tube 9 connects the two intersections and at the same time defines a scissors axis about which the rockers 8a and 8b can pivot relative to each other.

The arrangement of the vehicle seat 1 inside the vehicle and the usual direction of travel of the latter define the directional information used below. A direction oriented perpendicular to the ground is designated below as the vertical direction, and a direction perpendicular to the vertical direction and perpendicular to the direction of travel is designated below as the transverse direction.

The first rockers 8a are connected to each other at their rear ends by means of a holding tube 18 and are articulated on the upper frame 7. At their front ends, the first rockers 8a are connected by means of a bearing tube 20 and are guided movably on both sides, by means of a respective bearing device 21 in the lower frame 5, in the longitudinal direction, which corresponds approximately to the direction of travel.

The second rockers 8b are connected to each other at their rear ends by means of a holding tube 18 and are articulated on the lower frame 5. At their front ends, the second rockers 8b are likewise connected by means of a bearing tube 20 and are guided movably on both sides, by means of a respective bearing device 21 in the upper frame 7, in the longitudinal direction.

The transverse tube 9, the bearing tubes 20 and the holding tubes 18 extend in the present case in the transverse direction, likewise the scissors axis. By means of a pivoting movement of the first rockers 8a relative to the second rockers 8b about the scissors axis, the height of the upper frame 7 over the lower frame 5, referred to below for short as height of the scissors stand 3, is modified. By means of a pneumatic spring 12 and preferably a damper (not shown here), the scissors stand 3 becomes an oscillating system, which greatly increases the seat comfort.

The vehicle seat 1 also has a seat frame 6 which, on the one hand in its rear area, is articulated on the upper frame 7 on both sides and, on the other hand in its front area, can be raised and lowered by means of an inclination adjuster and is thus adjustable in terms of its inclination relative to the scissors stand 3.

The vehicle seat 1 also has a backrest 10 which, in the present case, is mounted adjustably in inclination on the seat frame 6. Alternatively, the backrest 10 can also be mounted on the upper frame 7. The backrest 10 is lined with a cover 28. A head rest 40 is provided in what is, in the vertical direction, an upper area of the backrest 10. The backrest 10 and the seat frame 6, which comprises a seat cushion, form a seat part 2.

Together with the scissors stand 3, the seat part 2 is displaceable by means of two pairs of rails, whereby the vehicle seat 1 is adjustable in translation in the longitudinal direction, which corresponds approximately to the direction of travel. The two pairs of rails are offset in relation to each other in the transverse direction and are arranged parallel to each other. The two pairs of rails are of substantially identical construction.

Each pair of rails comprises a first seat rail 45, which is also designated as upper rail, and a second seat rail 46, which is also designated as lower rail. The second seat rail 46 is in the present case rigidly connected to the structure of the vehicle, and the first seat rail 45 is rigidly connected to the lower frame 5 of the vehicle seat 1. Alternatively, it is conceivable to connect the second seat rail 46 to the structure of the vehicle by means of an adapter or a console. It is also conceivable to connect the first seat rail 45 to the lower frame 5 of the vehicle seat 1 by means of an adapter.

The first seat rail 45 is guided movably relative to and within the second seat rail 46. By means of a locking device, the first seat rail 45 can be locked with the second seat rail 46. An unlocking unit, which comprises an unlocking bar 44, serves to unlock the locking device.

The unlocking bar 44 is arranged in what is a front area of the vehicle seat 1 as seen in the direction of travel, or the longitudinal direction, and is mounted pivotably about a pivot axle, which in the present case extends in the transverse direction. By pulling the unlocking bar 44 upward in the vertical direction, it is pivoted about the pivot axle, as a result of which the locking device is unlocked.

The unlocking lever 44 and the pivot axle are assigned kinematically to the lower frame 5 and to the first seat rail 45. This means that, during a displacement of the seat part 2 in the longitudinal direction, the unlocking lever 44 accordingly moves along too, but not in the case of a change of height of the scissors stand 3, i.e. during a movement of the seat part 2 in the vertical direction.

Those parts of the upper frame 7 and of the lower frame 5 that extend in the longitudinal direction each have a C-shaped profile open toward the interior of the vehicle seat 1. Each bearing device 21 has a load roller 14, which is mounted rotatably about a bearing axle 16 extending in the transverse direction and which protrudes into an open C-shaped profile of the upper frame 7 or of the lower frame 5.

The C-shaped profile of the upper frame 7 and the C-shaped profile of the lower frame 5 each have an upper limb 30 and a lower limb 32, which is arranged underneath the upper limb in the vertical direction. The upper limb 30 and the lower limb 32 extend parallel to each other, and they are connected to each other by a base limb 34 extending at right angles to them. Thus, the upper limb 30, the lower limb 32 and the base limb 34 form a C-shaped profile in cross section.

The load roller 14 of the bearing device 21 is mounted rotatably here on a cylindrical bearing shaft 24. The bearing shaft 24 is fixedly connected to the bearing tube 20, wherein the center axes of the bearing tube 20 and of the bearing shaft 24 are aligned with each other and form the bearing axis 16 of the load roller 14. In the present case, the load roller 14 is of approximately cylindrical design.

Furthermore, a compensating roller 36 is mounted on the cylindrical bearing shaft 24 so as to be rotatable about the bearing axis 16. In the present case, the compensating roller 36 is also of approximately cylindrical design. In the present case, the compensating roller 36 has the same diameter as the load roller 14.

In the present case, the load roller 14 is arranged on the bearing shaft 24 on the outside in the transverse direction, i.e. facing the base limb 34 of the C-shaped profile. The compensating roller 36 is arranged on the bearing shaft 24 on the inside in the transverse direction, i.e. facing the bearing tube 20.

Inserts 60 which likewise have an approximately C-shaped cross section are introduced in each case within the C-shaped profiles of the upper frame 7 and of the lower frame 5. Each insert 60 here has a head region 50, a foot region 52 and a side region 54 which is connected to the head region 50 and the foot region 52. The head region 50 here is arranged parallel to the upper limb 30, the foot region 52 is arranged substantially parallel to the lower limb 32 and the side region 54 is arranged parallel to the base limb 34 of the C-shaped profile.

The head region 50 bears tightly against the upper limb 30, while a gap is provided between the foot region 52 and the lower limb 32. The side region 54 is welded to the base limb 34 of the C-shaped profile, in the present case by means of laser welding.

The foot region 52 comprises a first section 62 which adjoins the side region 54, and a second section 64 which adjoins the first section 62 and faces away from the side region 54. The first section 62 and the head region 50 are arranged here approximately opposite each other in the vertical direction and facing each other.

Figure 3:
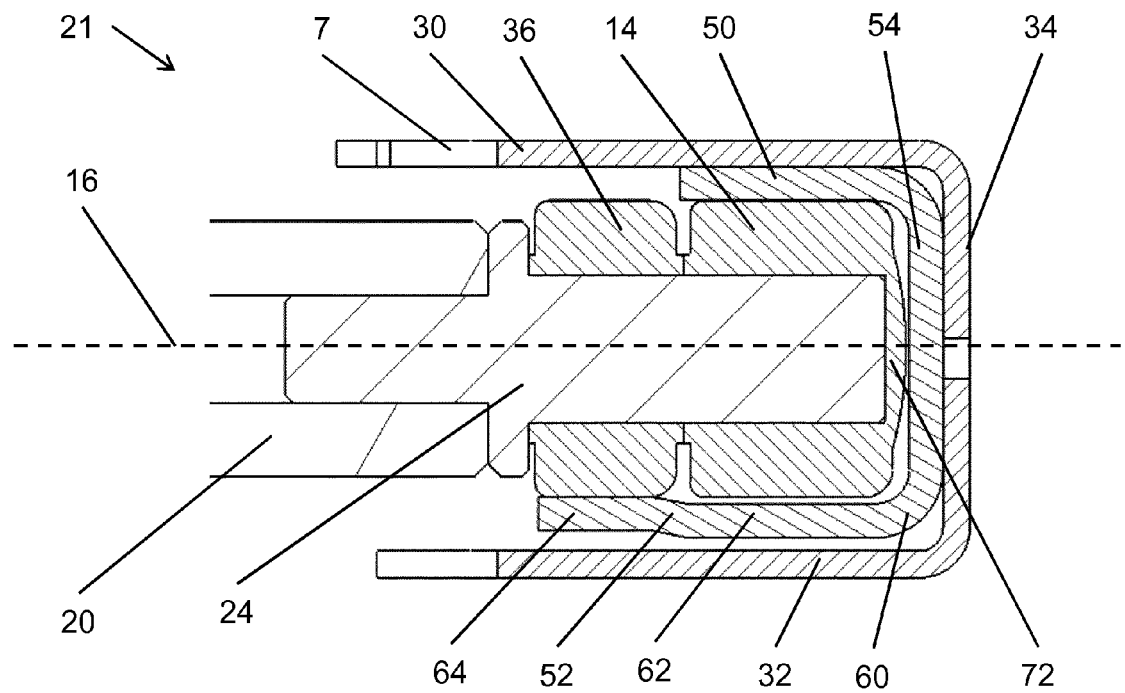
FIG. 3 is a section through a bearing device according to a first exemplary embodiment perpendicularly to the longitudinal direction.
Figure 4:
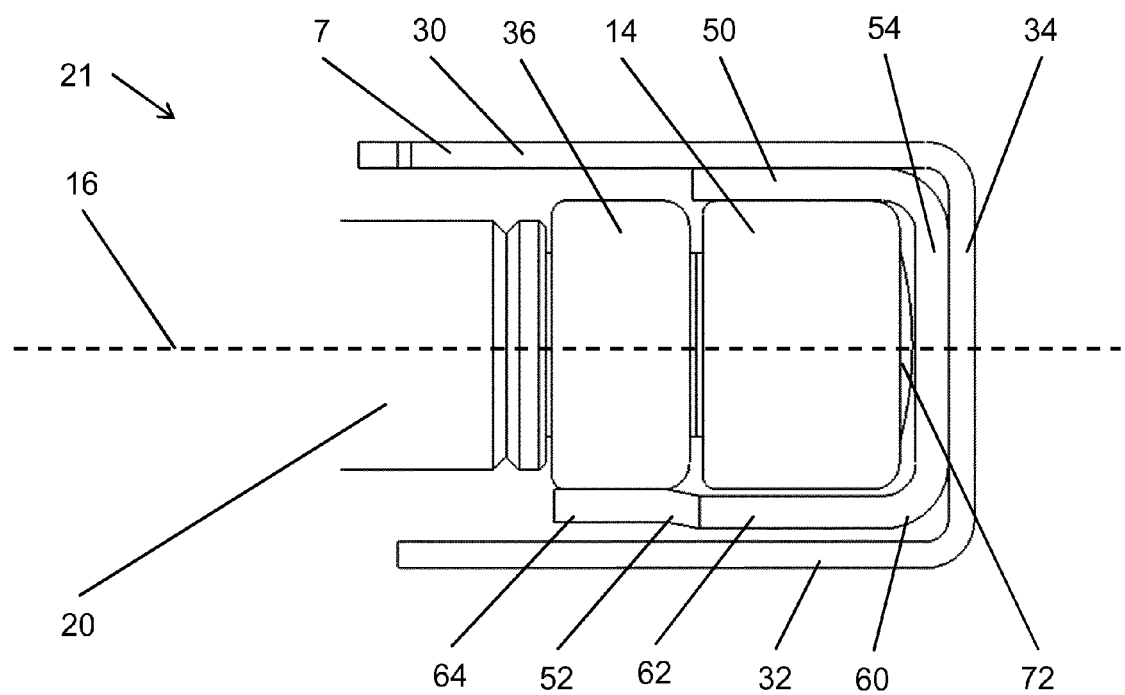
FIG. 4 is a frontal view of a bearing device according to the first exemplary embodiment, as seen in longitudinal direction.
Figure 5:
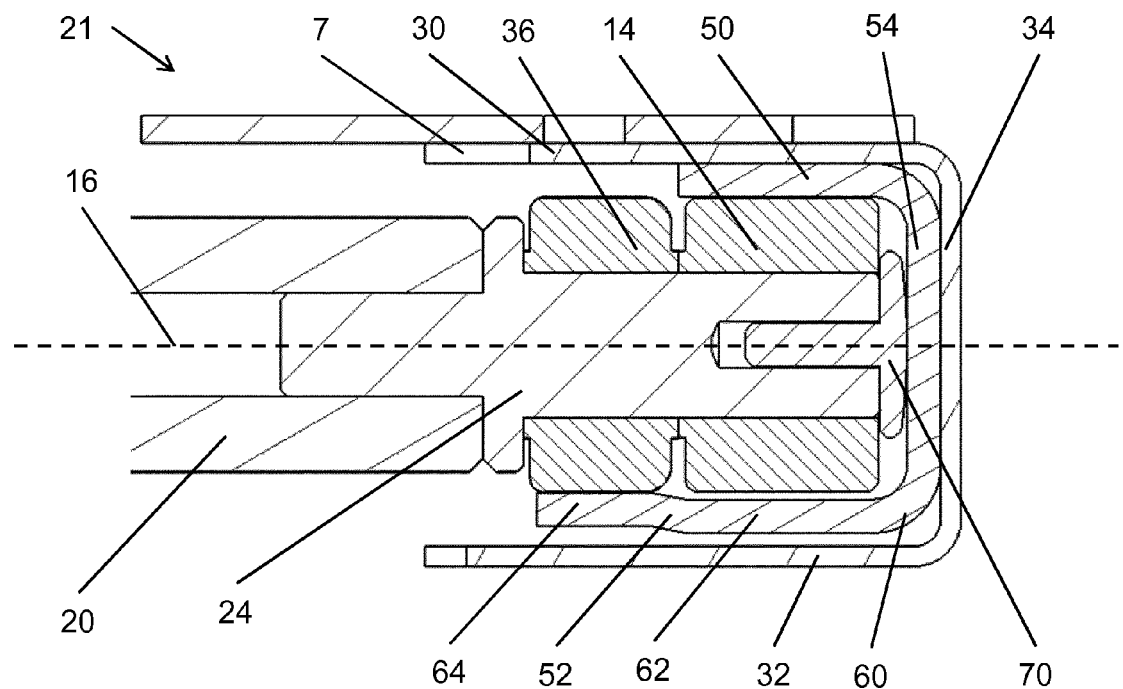
FIG. 5 is a section through a bearing device according to a second exemplary embodiment perpendicularly to the longitudinal direction.
Figure 6:
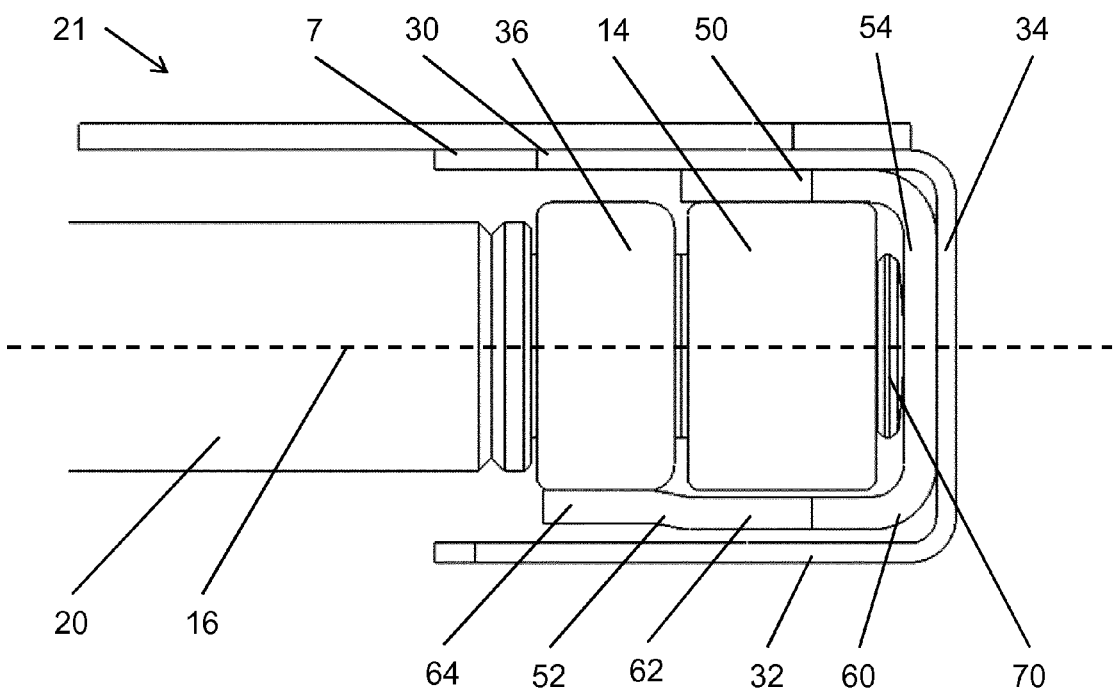
FIG. 6 is a frontal view of a bearing device according to the second exemplary embodiment, as seen in longitudinal direction.

According to a first exemplary embodiment illustrated in FIG. 3 and FIG. 4 and according to a second exemplary embodiment illustrated in FIG. 5 and FIG. 6, the second section 64 is designed in the form of an embossed step and lies approximately parallel to and offset in the vertical direction with respect to the first section 62. The first section 62 here is located closer to the lower limb 32 than the second section 64.

The head region 50 forms a first guide for the load roller 14, and the second section 64 of the foot region 52 forms a second guide for the compensating roller 36. It is ensured by the shape of the embossed step that the compensating roller 36 is in contact with the second section 64 of the foot region 52 while the load roller 14 is spaced apart in the vertical direction from the first section 62 of the foot region 52.

In the present case, the insert 60 is composed of steel and is therefore elastic. In particular, the foot region 52 is elastic and therefore acts similarly to a spring. The second section 64 here presses upward in the vertical direction against the compensating roller 36. The load roller 14 is pressed upward here against the head region 50.

It is thus ensured that the compensating roller 36 and the load roller 14 are constantly in contact with the corresponding guides and bear against the first guide and against the second guide. As a result, component tolerances can be compensated for and play in the vertical direction is eliminated.

According to the first exemplary embodiment illustrated in FIG. 3 and FIG. 4, an enlarged portion 72 mounted on the load roller 14 serves to compensate for play in the transverse direction. The enlarged portion 72 is located here on that end side of the load roller 14 which faces the side region 54 of the insert 60, and projects in the transverse direction beyond the rest of the load roller 14. The enlarged portion 72 bears here against the side region 54 of the insert 60. In the present case, the enlarged portion 72 is designed as a camber, which is in the shape of a spherical section, of the end side of the load roller 14. Other configurations are also conceivable.

According to the second exemplary embodiment illustrated in FIG. 5 and FIG. 6, a sliding element 70 which is inserted into a bearing bore in the bearing shaft 24, the bearing bore running in the transverse direction, is provided in order to compensate for play in the transverse direction. The sliding element 70 bears here against the side region 54 of the insert 60.

Figure 7:
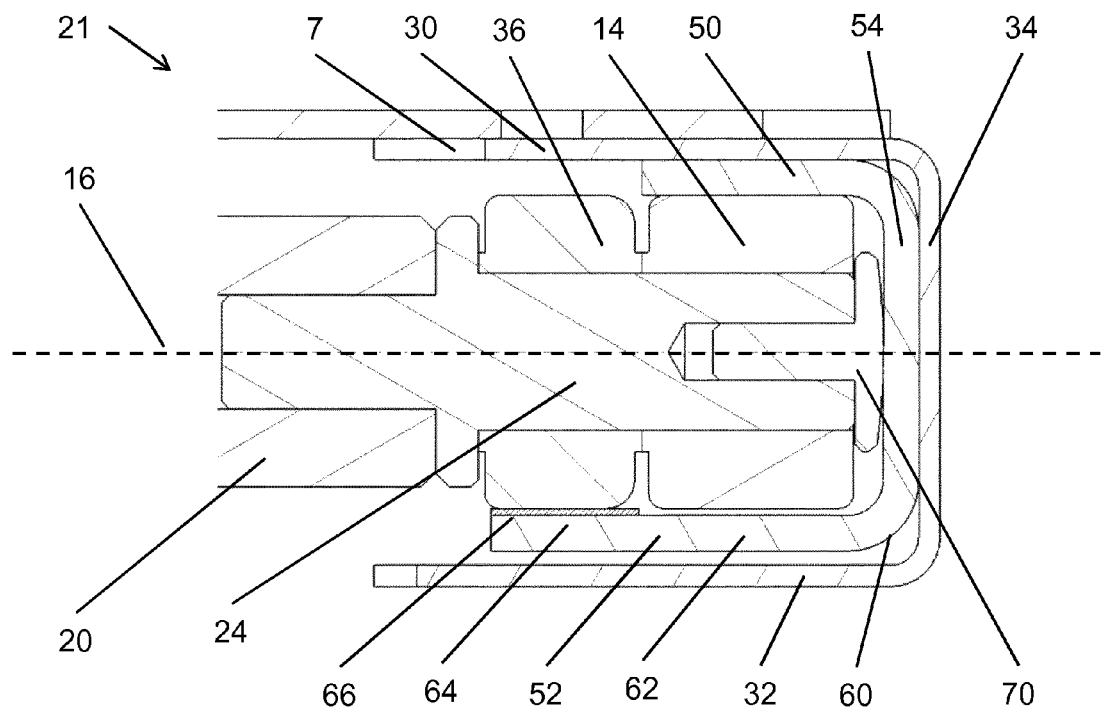
FIG. 7 is a section through a bearing device according to a third exemplary embodiment perpendicularly to the longitudinal direction.
Figure 8:
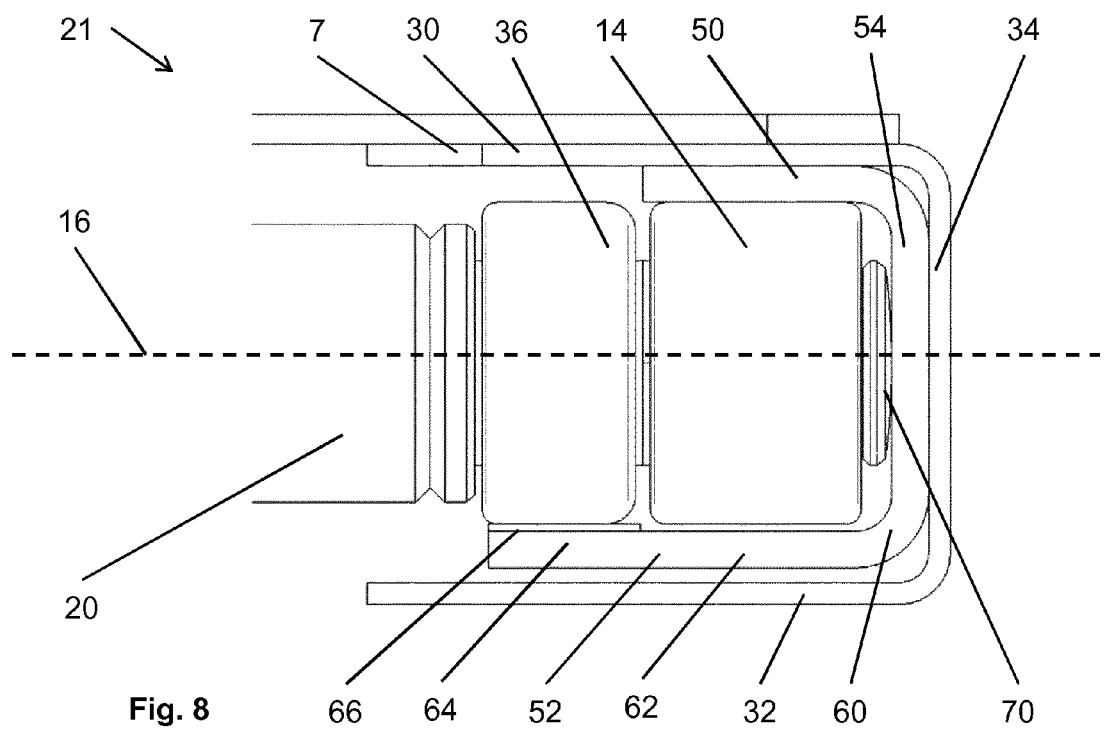
FIG. 8 is a frontal view of a bearing device according to the third exemplary embodiment, as seen in longitudinal direction.
Figure 9:
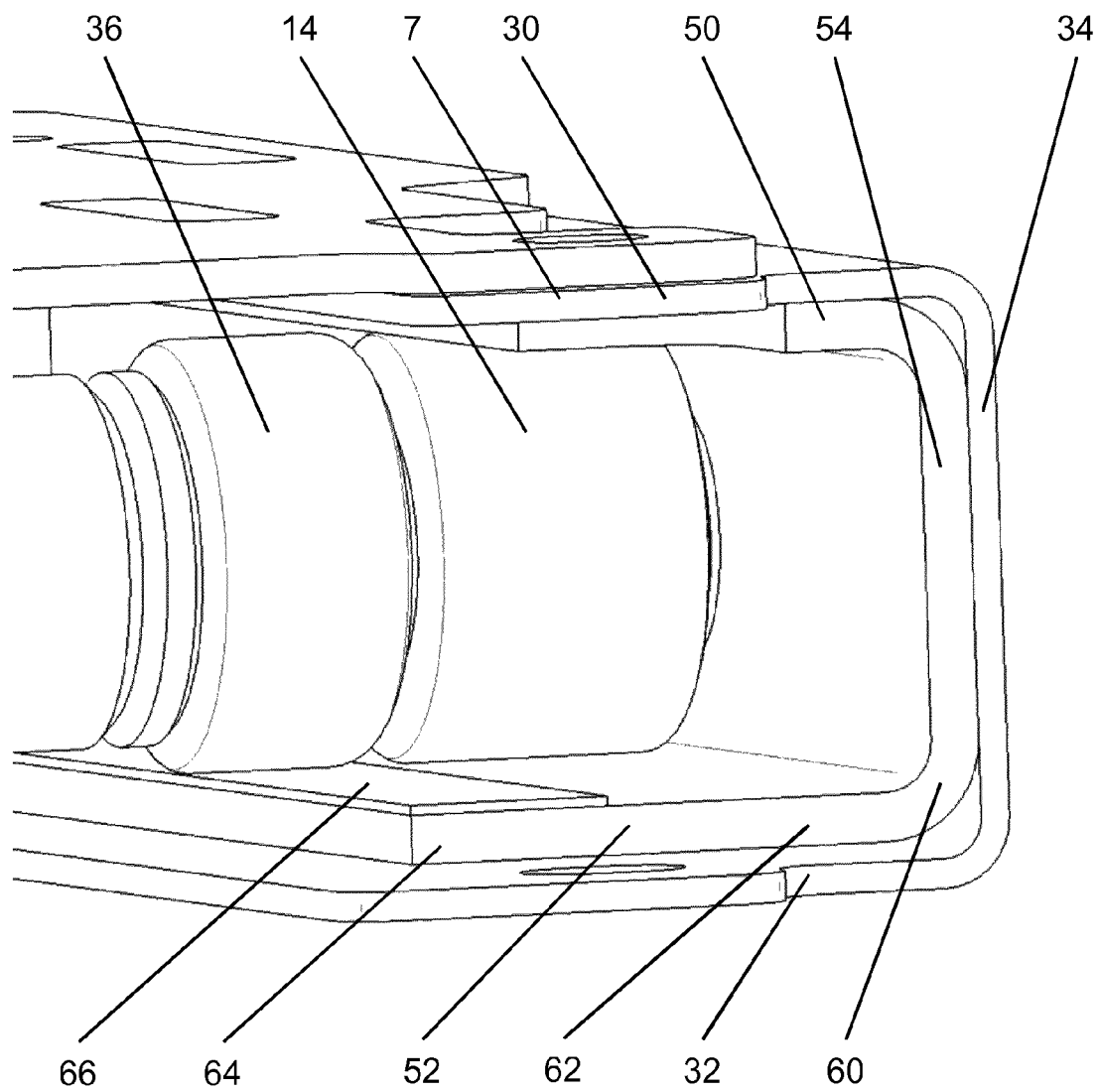
FIG. 9 is a perspective illustration of a bearing device according to the third exemplary embodiment.
Figure 10:
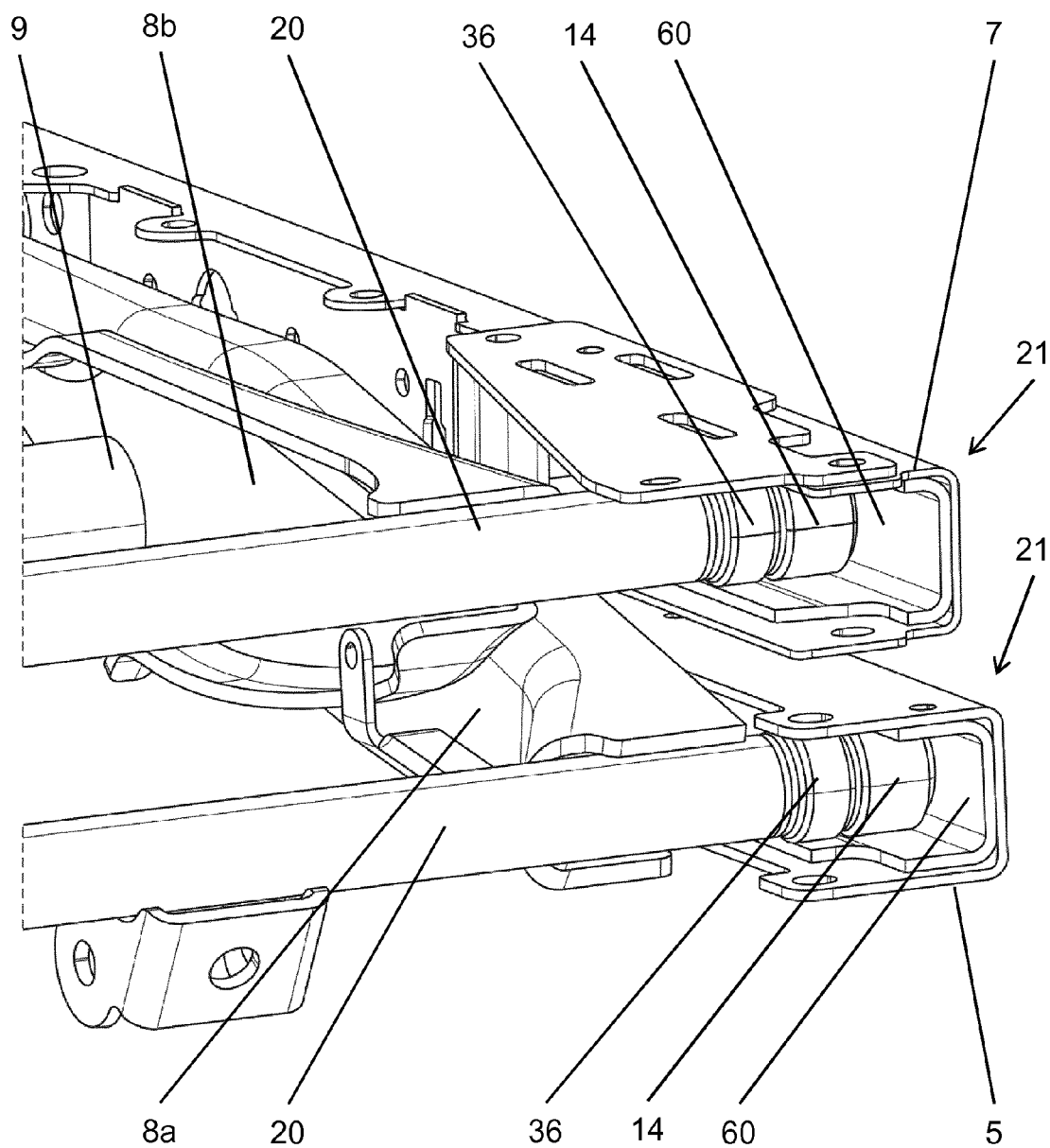
FIG. 10 is a perspective illustration of two bearing devices on upper frame and lower frame of a vehicle seat.

According to a third exemplary embodiment illustrated in FIG. 7, FIG. 8 and FIG. 9, the second section 64 adjoins the first section 62 rectilinearly. A support 66 is mounted, in the present case adhesively bonded, on the second section 64 of the foot region 52, the support 66 forming the second guide for the compensating roller 36 while the head region 50 forms the first guide for the load roller 14. The support 66 ensures that the compensating roller 36 is in contact with the second guide while the load roller 14 is spaced apart in the vertical direction from the first section 62 of the foot region 52.

In the present case, the second support 66 is composed of a hard plastic which is not elastic or is elastic only to a small extent. It is also conceivable for the support 66 to be composed of an elastic material, for example rubber.

The insert 60 is also composed of steel, and is therefore elastic, in the third exemplary embodiment. In particular, the foot region 52 is elastic and therefore acts in a similar manner to a spring. The second section 64 presses upward here with the support 66 in the vertical direction against the compensating roller 36. The load roller 14 is pressed upward here against the head region 50.

It is thus also ensured in the third exemplary embodiment that the compensating roller 36 and the load roller 14 are continuously in contact with the corresponding guides and bear against the first guide and against the second guide. As a result, component tolerances can be compensated for and play in the vertical direction is eliminated.

According to the third exemplary embodiment illustrated in FIG. 7, FIG. 8 and FIG. 9, a sliding element 70 which is inserted into a bearing bore in the bearing shaft 24, which bearing bore runs in the transverse direction, and bears against the side region 54 of the insert 60 serves to compensate for play in the transverse direction, in a similar manner as in the second exemplary embodiment illustrated in FIG. 5 and FIG. 6.

In a similar manner as in the first exemplary embodiment illustrated in FIG. 3 and FIG. 4, it is also conceivable, in order to compensate for play in the transverse direction, to provide an enlarged portion on the load roller 14, which enlarged portion is located on that end side of the load roller 14 which faces the side region 54 of the insert 60, and projects in the transverse direction beyond the rest of the load roller 14. The enlarged portion then bears against the side region 54 of the insert 60.

In the exemplary embodiments described here, the bearing devices 21 which interact with the lower frame 5 correspond in design and function to the bearing devices 21, which are described here, on the upper frame 7. FIG. 7 illustrates part of a vehicle seat with bearing devices 21 on the upper frame 7 and on the lower frame 5.

The features disclosed in the above description, the claims and the drawings may be of significance both individually and in combination for realizing the invention in the various configurations thereof.

While specific embodiments of the invention have been shown and described in detail to illustrate the application of the principles of the invention, it will be understood that the invention may be embodied otherwise without departing from such principles.

The invention claimed is:

1. A vehicle seat comprising a scissors stand for adjusting a seat height, the scissors stand comprising:
   intersected rockers;
   at least one frame; and
   a bearing device movably guiding the rockers relative to the frame, the bearing device comprising:
   an insert defining or being connected to a first guide and a second guide, the insert having a foot region, a head region extending parallel to the foot region and a side region extending at a right angle to the foot region;
   a bearing roller rotatable about a bearing axis and interacting with the first guide; and
   a compensating roller rotatable about the bearing axis and interacting with the second guide, the second guide being defined by or being attached to the foot region of the insert, at least one of the side region of the insert and the head region of the insert being fastened to the frame, and the foot region is of an elastic design and presses against the compensating roller, the frame having a C-shaped profile which is open toward an interior of the vehicle seat and comprises an upper limb, a lower limb running parallel to the upper limb and a base limb which runs at a right angle to the upper limb and connects the upper limb to the lower limb, at least one of the side region of the insert is fastened to the base limb and the head region of the insert is fastened to the upper limb, the foot region of the insert being arranged at least substantially parallel to the lower limb, wherein a gap is provided between the foot region of the insert and the lower limb.

2. A vehicle seat as claimed in claim 1, wherein the insert has an open C-shaped profile.

3. A vehicle seat as claimed in claim 1, wherein the head region of the insert forms the first guide for the bearing roller.

4. A vehicle seat as claimed in claim 1, wherein:
   the head region of the insert runs parallel to the upper limb; and
   the head region of the insert bears tightly against the upper limb.

5. A vehicle seat as claimed in claim 1, wherein the foot region of the insert comprises a first section which adjoins the side region of the insert and a second section which faces away from the side region of the insert; and
   the second section is designed in the form of an embossed step and is arranged offset parallel to the first section.

6. A vehicle seat as claimed in claim 5, wherein the second section forms the second guide for the compensating roller.

7. A vehicle seat as claimed in claim 1, wherein the second guide for the compensating roller is formed by a support mounted on the foot region of the insert.

8. A vehicle seat as claimed in claim 1, wherein the insert is composed of metal.

9. A vehicle seat as claimed in claim 1, wherein the insert is composed of steel.

10. A vehicle seat comprising a scissors stand for adjusting a seat height, the scissors stand comprising:
    a first rocker;
    a second rocker, said first rocker intersecting said second rocker;
    a frame; and
    a bearing device movably guiding the first rocker and the second rocker relative to the frame, the bearing device comprising:
    an insert defining or being connected to a first guide and a second guide, the insert having a foot region, a head region extending parallel to the foot region and a side region extending at a right angle to the foot region;
    a bearing roller rotatable about a bearing axis and interacting with the first guide; and
    a compensating roller rotatable about the bearing axis and interacting with the second guide, the second guide being defined by or being attached to the foot region of the insert, at least one of the side region of the insert and the head region of the insert being fastened to the frame, the foot region being elastic, wherein the foot region presses upward in a vertical direction against the compensating roller, the frame having a C-shaped profile which is open toward an interior of the vehicle seat and comprising an upper limb, a lower limb running parallel to the upper limb and a base limb which runs at a right angle to the upper limb and connects the upper limb to the lower limb, at least one of the side region of the insert being fastened to the base limb and the head region of the insert being fastened to the upper limb.

11. A vehicle seat as claimed in claim 10, wherein the frame comprises a lower limb, the foot region of the insert being arranged at least substantially parallel to the lower limb, wherein a gap is provided between the foot region of the insert and the lower limb.

12. A vehicle seat as claimed in claim 10, wherein:
    the foot region of the insert is arranged at least substantially parallel to the lower limb; and
    a gap is provided between the foot region of the insert and the lower limb.

13. A vehicle seat comprising a scissors stand for adjusting a seat height, the scissors stand comprising:
    a first rocker;
    a second rocker, said first rocker intersecting said second rocker;
    a frame; and
    a bearing device movably guiding the first rocker and the second rocker relative to the frame, the bearing device comprising:
    an insert defining or being connected to a first guide and a second guide, the insert having a foot region, a head region extending parallel to the foot region and a side region extending at a right angle to the foot region;

a bearing roller rotatable about a bearing axis and interacting with the first guide; and a compensating roller rotatable about the bearing axis and interacting with the second guide, the second guide being defined by or being attached to the foot region of the insert, at least one of the side region of the insert and the head region of the insert being fastened to the frame, the foot region being elastic, wherein an upward force is applied to the compensating roller via said foot region, the frame comprising a lower limb, the foot region of the insert being arranged at least substantially parallel to the lower limb, wherein a gap is provided between the foot region of the insert and the lower limb.

14. A vehicle seat as claimed in claim 13, wherein:

the frame has a C-shaped profile which is open toward an interior of the vehicle seat and comprises an upper limb, a lower limb running parallel to the upper limb and a base limb which runs at a right angle to the upper limb and connects the upper limb to the lower limb; and at least one of the side region of the insert is fastened to the base limb and the head region of the insert is fastened to the upper limb.

15. A vehicle seat as claimed in claim 14, wherein:

the foot region of the insert is arranged at least substantially parallel to the lower limb; and a gap is provided between the foot region of the insert and the lower limb.

16. A vehicle seat as claimed in claim 13, wherein the insert is composed of metal.

\* \* \* \* \*